United States Patent [19]

Huber

[11] Patent Number: 5,025,915
[45] Date of Patent: Jun. 25, 1991

[54] DRIVE ROLLER UNIT

[75] Inventor: Thomas Huber, Iffeldorf, Fed. Rep. of Germany

[73] Assignee: Bavaria Cargo Technologie GmbH, Fed. Rep. of Germany

[21] Appl. No.: 508,451

[22] Filed: Apr. 13, 1990

[30] Foreign Application Priority Data

Feb. 8, 1990 [EP] European Pat. Off. ........ 90102495.0

[51] Int. Cl.$^5$ ............................................. B65G 13/02
[52] U.S. Cl. ..................................... 198/782; 198/788
[58] Field of Search ........................ 198/780, 782, 788

[56] References Cited

U.S. PATENT DOCUMENTS 4,697,694 10/1987 Huber ................................. 198/782
4,792,037 12/1988 Huber ................................. 198/788

FOREIGN PATENT DOCUMENTS 8816438 10/1989 Fed. Rep. of Germany .
8816547 2/1990 Fed. Rep. of Germany .

Primary Examiner—Joseph E. Valenza
Assistant Examiner—Tuan N. Nguyen
Attorney, Agent, or Firm—Sughrue, Mion, Zinn, Macpeak & Seas

[57] ABSTRACT

A drive roller unit for driving articles on a conveyor track includes a drive roller which can be driven in rotation by an electric motor by way of a planetary transmission. The drive roller is mounted rotatably on a guide body by means of which it is movable with respect to a base of the unit between a lower rest position and an upper drive position in which it is in engagement with the underside of the article to be driven. An internal gear ring which is fixedly connected to the drive roller internally thereof forms a crown wheel of the planetary transmission, while at least one planet wheel of the planetary transmission meshes on the one hand with the internal gear ring and on the other hand with the sun wheel of the planetary transmission. The sun wheel is driven by the electric motor. The planet wheel carrier is rotatably mounted in the guide body and is provided with a tooth arrangement which rolls against a guide gear. The guide gear is concentric with respect to the axis of rotation of the guide body, about which the guide body rotates in moving between the upper and lower positions of the drive roller.

5 Claims, 2 Drawing Sheets

DRIVE ROLLER UNIT

BACKGROUND OF THE INVENTION

A drive roller unit for driving an article such as a freight container on a conveyor track as described in U.S. Pat. No. 4,792,037 comprises a drive roller which can be driven in rotation by an electric motor by way of a planetary transmission and which is mounted rotatably on a guide body, by means of which it is movable relative to a base of the unit between a lower rest position and an upper drive position in which it is in engagement with the underside of the article to be driven. The drive roller is substantially in the form of a hollow circular cylinder and the electric motor, the guide body and the planetary transmission are arranged in the interior of the hollow cylindrical drive roller. The guide body is in the form of a hollow body and has circular-cylindrical outside peripheral surface regions on which the drive roller is concentrically mounted, with the guide body being mounted rotatably about an axis of rotation which is stationary with respect to the base and which is eccentric with respect to its circular-cylindrical outside peripheral surface regions. Disposed non-rotatably at the inside of the hollow cylindrical drive roller is an internal gear ring which is concentric with respect thereto, while the stator of the electric motor which is arranged within the guide body is fixedly connected to the guide body. The stator of the electric motor, which includes the field winding, is rigidly and non-rotatably connected to a stator housing which serves as the guide body, whose circular-cylindrical outside peripheral surface, as mentioned above, is arranged eccentrically with respect to the axis of rotation of a drive gear. With that design configuration, when the motor is switched on, the rotor which is disposed in the interior of the stator initially remains in a stationary condition because of its inherent inertia and by virtue of a step-down transmission arrangement which brakes it, together with a particular brake, so that the motor torque acting between the stator and the rotor rotates the stator arrangement and therewith the guide body formed by its housing, around the axis of rotation, which is stationary with respect to the base, of the drive gear which meshes with the internal tooth arrangement of the drive roller. As a result, because the guide body is eccentric with respect to the axis of rotation of the drive gear, the drive roller which is mounted on the guide body moves out of its lower rest position into the upper operative position in which it comes to bear against the bottom of the article to be conveyed, which is disposed above it.

A further drive roller unit as disclosed in U.S. Pat. No. 3698539 has a base or main frame which is to be secured for example to the floor of an aircraft freight compartment, and a mounting frame structure which is mounted at one end pivotably to the base or main frame. In the vicinity of the pivot axis the mounting frame structure carries a motor while at a spacing relative to the pivot axis it has a drive roller which is mounted in such a way as to be rotatable about an axis which is stationary with respect to the mounting frame structure, together with a cam control arrangement which is connected to the free end of the mounting frame structure and by means of which the mounting frame structure is pivotable relative to the main frame from the rest position into the operative position. The output shaft of the motor is connected by way of a transmission train to the input of a planetary transmission, one input of which is coupled by way of a transmission arrangement to the drive shaft of the drive roller while the other output of the planetary transmission drives the cam control unit.

In the rest condition the mounting frame structure lies on the main frame so that the drive roller is disposed in a lowered condition at a spacing from the bottom of a freight container positioned above same on a roller conveyor track. In order to set the freight container in movement on the roller track, the motor is firstly switched on to drive the input of the planetary transmission. At that time the drive roller is prevented from rotating by means of a slipping clutch with a predetermined braking torque, so that the drive moment of the motor inevitably acts by way of the other output of the planetary transmission on the cam control unit which, as a result, by virtue of its cams which bear against the main frame, pivots the mounting frame structure upwardly into the operative position until the drive roller comes into engagement with the underside of the bottom of the freight container. The weight of the freight container causes the movement of the cam control unit to be blocked thereby as the drive roller is pressed against the bottom of the container. As a result the output of the planetary transmission which drives the cam control unit is also blocked so that the other output of the planetary transmission, which is operatively connected to the drive roller, transmits to the drive roller a braking moment which overcomes the braking torque of the slipping clutch so that the drive roller, while being pressed against the bottom of the container, begins to rotate, and the container is moved forwardly in a direction which is dependent on the direction of rotation of the drive motor.

A problem which occurs in that arrangement in a practical situation is that the entire transmission arrangement from the motor to the drive roller on the one hand and to the cam control arrangement on the other hand is of a very expensive design configuration and comprises a large number of parts. In addition a cam control arrangement is required so that the overall structure includes a large number of mechanically moved components. As a result, not only does that assembly involve a high level of manufacturing costs but it is only of a large size and is of a high weight which is extremely undersirable precisely in regard to aircraft construction. Furthermore undesirable precisely in regard to aircraft construction. Furthermore the large number of components which are moved relative to each other gives rise to susceptibility to wear and short periods of time between maintenance operations are required in order to guarantee the high level of reliability required in operating aircraft. In particular, the individual components of the above-discussed drive roller unit are disposed more or less without protection in a juxtaposed relationship so that in operation it is not only necessary to reckon on the assembly suffering from fouling, with the operational disturbances which are caused thereby, but it is also susceptible to damage caused by objects penetrating into the mechanism or due to the direct action of a force thereon.

A drive roller unit which is similar in terms of design and mode of operation is also to be found in U.S. Pat. No. 4,697,694 in which, besides being of large size, the arrangement may also suffer in operation from problems due to foreign bodies penetrating into the mechanism or due to the effect of a force acting thereon.

SUMMARY OF THE INVENTION

An object of the invention is to provide a drive roller unit which enjoys enhanced reliability and which is of a simplified design configuration.

Another object of the invention is a drive roller unit for driving an article on a conveyor track, which affords better protection for the components thereof.

Still another object of the present invention is to provide a drive roller unit of compact construction which requires a low level of maintenance in comparative terms in relation to operation in an aircraft environment.

These and other objects are attained by a drive roller unit in accordance with the principles and teachings of the present invention.

The design configuration of the drive roller unit in accordance with the invention provides that the moving components of the unit such as the drive motor, the guide body and the planetary transmission are disposed in the interior of the hollow-cylindrical drive roller so that those elements are protected from fouling and damage. In addition, the unit of the invention provides a simplification in construction over the prior-art arrangements described above by virtue of the omission of the transmission arrangement which is required therein to drive the roller and the cam control assembly and in particular the drive gear and the brake.

In a preferred configuration of the invention the rotor and the stator of the electric motor means may be arranged concentrically with respect to each other and concentrically with respect to the circular-cylindrical outside peripheral surface means of the guide body. That arrangement provides for particularly good utilisation of the space in the interior of the hollow-cylindrical drive roller and the guide body which is in the form of a hollow body so that a drive roller unit of given external dimensions can use a large and therefore also powerful motor.

It is preferably provided that the tooth arrangement of the planet carrier is in the form of an internal gear ring which is disposed eccentrically round the guide gear and which is concentric with respect to the circular-cylindrical outside peripheral surface means of the guide body. That construction gives the advantage that only low tipping moments occur at the planet carrier during the rolling movement around the guide gear, so that the bearings of the planet carrier in the guide body are subjected to only a low level of loading.

Alternatively it may be provided that the tooth arrangement of the planet carrier is in the form of an external tooth arrangement which rolls against the guide gear and which is concentric with respect to the circular-cylindrical outside peripheral surface means of the guide body. That construction is simple and inexpensive to produce as the external tooth arrangement on the planet carrier may be for example formed by a gear of conventional nature which is rigidly and non-rotatably connected to the planet carrier.

Normally, in the above-described embodiments of the drive roller unit according to the invention, the article to be driven such as a freight container lies on the drive roller in the rest position and holds it fast with a braking moment which is determined by the weight of the article. In that way the drive roller is braked to prevent it from rotating, when the unit is switched on, and thereby moves out of its lower rest position into its upper operative position to press against the bottom of the freight container. Accordingly the desired lifting movement of the drive roller out of its lower rest position into its upper operative position is produced solely by the braking effect of the article bearing against it. If it is desired that the drive roller is to move upwardly into the operative position upon the unit being switched on, even without an article lying thereon, it may be provided that the rotary movement of the drive roller is subjected to the loading of a defined braking moment. For that purpose it may advantageously be provided that the mountings of the drive roller on the guide body brake the rotary movement of the drive roller relative to the guide body, with a predetermined level of braking force. That braking force acts in the same way as the braking moment of an article to be conveyed and therefore provides the same function, more specifically, when the unit is switched on, lifting the drive roller out of the lower rest position into the upper drive position and pressing it against the underside of the article to be conveyed.

It will be seen hereinafter that the drive roller unit for driving an article on a conveyor track, for example in an aircraft freight component, can be of a compact size and low weight which make it eminently suitable for use in an aircraft situation.

Further objects, features and advantages of the present invention will be apparent from the following description of preferred embodiments.

DESCRIPTION OF PREFERRED EMBODIMENTS

Figure 1:
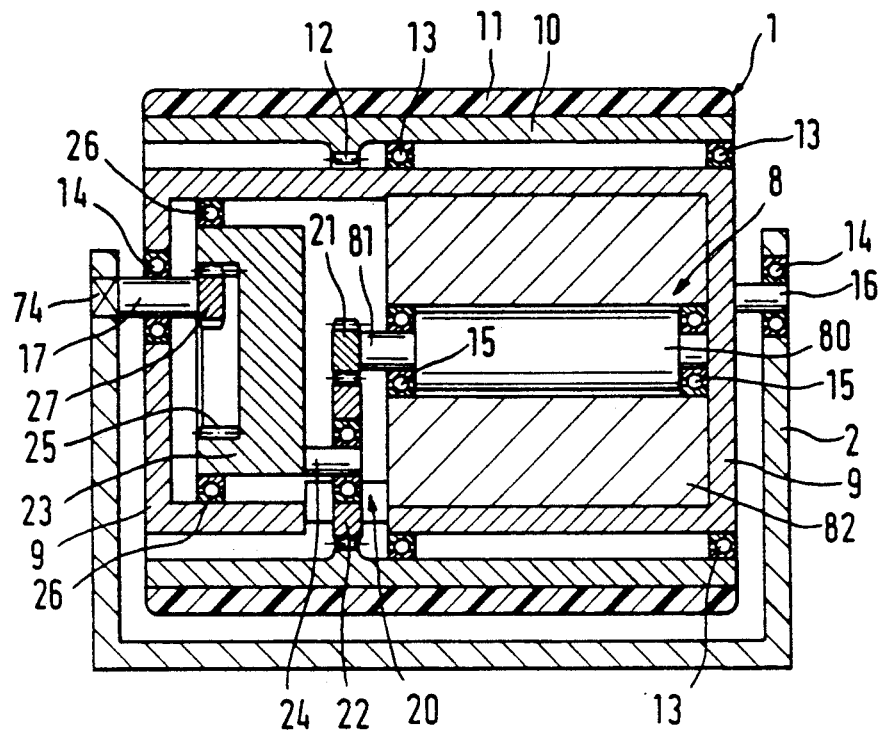
FIG. 1 is a highly diagrammatic vertical longitudinal section of a first embodiment of a drive roller unit according to the invention.

Referring to FIG. 1, the basic construction and the mode of operation of a first embodiment of a drive roller unit according to the invention will first be described. FIG. 1 is shown in highly simplified and diagrammatic form for the purposes of explaining and better understanding the basic principle of the invention.

As shown in FIG. 1, the drive roller unit basically comprises a drive roller 1 which is substantially in the form of a hollow circular cylinder and the interior of which accomodates a guide body 9, an electric motor means 8, a planetary transmission 20 and a guide gear 27. The motor means 8 is drivingly coupled by way of the planetary transmission 20 to the guide body 9 and the drive roller 1. The entire drive roller unit is mounted in a base 2 which is fixed in a roller conveyor track or which represents a component thereof. The guide body 9 has a substantially circular-cylindrical outside surface on which the drive roller 1 is rotatably mounted by means of the rolling bearings 13. The guide body 9 is mounted rotatably relative to the base 2 of the unit about an axis of rotation which is eccentric with respect to its cylindrical outside surface, on a mounting trunnion 16 at the axial end of the guide body 9 at the right in FIG. 1, and on a mounting trunnion 17 at its axial end at the left in FIG. 1. by means of the rolling bearings 14. The guide body 9 is in the form of a hollow body, the motor means 8 being accommodated in the right-hand part of the interior thereof. The motor means 8 includes a stator 82 which is fixedly connected to the guide body 9 and which includes the field winding of the electric motor means 8, which is connected to the power supply of the base 2 by way of a contact arrangement (not shown) comprising slip rings and sliding contacts. The stator 82 is arranged concentrically with respect to the circular-cylindrical outside surface of the guide body 9 and disposed within the stator 82, once again concentrically with respect to the outside surface thereof, is a rotor 80 which is mounted rotatably in the stator 82 by means of the rolling bearings 15 and which has a rotor shaft 81, the end thereof which is shown at the left in FIG. 1 non-rotatably carrying the sun wheel 21 of the planetary transmission 20.

The planetary transmission 20 has at least one planet wheel 22 which is rotatably mounted on a mounting trunnion 24 of the planet carrier 23 and which meshes on the one hand with the sun wheel 21 and on the other hand with an internal tooth arrangement 12 of the drive roller 1, the internal tooth arrangement 12 being in the form of the crown wheel of the planetary transmission 20.

The planet carrier 23 is rotatably mounted within the guide body 9 by means of the bearing 26 concentrically with respect to the circular-cylindrical outside peripheral surface regions of the guide body 9. Formed in the portion of the planet carrier 23 which is at the left in FIG. 1 is a recess in which there is formed a tooth arrangement 25 which is in the form of an internal gear ring and which is also concentric with respect to the circular-cylindrical outside peripheral surface regions of the guide body 9. The tooth arrangement 25 is in meshing engagement with a guide gear 27 which is non-rotatably connected to the mounting trunnion 17 and which is concentric with respect to the axis of rotation of the guide body 9.

The drive roller 1 comprises an inner roller body 10 which is substantially in the form of a hollow cylinder and a roller casing portion 11 of elastic material, which covers the outside surface of the roller body 10. Formed on or mounted to the inner surface of the substantially hollow-cylindrical roller body 10, in the left-hand half of FIG. 1, is an internal gear ring 12 which is disposed concentrically with the roller body 10 and which is in meshing engagement with the planet wheel 22 of the planetary transmission 20. The drive roller 1 is mounted rotatably on and in concentric relationship with the circular-cylindrical outside surface of the guide body 9, by means of the bearings 13 which are in the form of needle or ball bearings. The outside surface of the guide body is arranged eccentrically with respect to the axis of rotation of the guide body 9 on the base 2. On the one hand, that arrangement constantly ensures meshing engagement of the planet gear 22 with the internal gear ring 12, while at the same time maintaining the eccentric arrangement of the drive roller 1 and the internal gear ring 12 with respect to the axis of rotation of the guide body 9.

FIG. 1 shows the rest position of the drive roller in the lowered condition in which it is out of engagement with an article (not shown) to be conveyed, which is supported on the associated roller conveyor track.

If now, starting from that rest condition, the supply of power to the electric motor means 8 is switched on, then, as in any other electric motor, a torque acts between the rotor 80 and the stator 82. Because of the higher degree of inherent inertia of the stator 82 and the guide body which is connected thereto, the rotor 80 firstly begins to rotate, and in so doing drives in rotation the sun wheel 21 of the planetary transmission 20. The sun wheel 21 drives the planet wheel 22 which is in meshing engagement with the internal gear ring 12 of the drive roller, which is in the form of the crown wheel. Because of the inherent inertia of the drive roller 1 and the bearing friction of the bearings 13 relative to the guide body 9, the drive roller 1 initially remains in a stationary condition. Therefore the planet wheel 22 must necessarily roll against the internal gear ring 12, which is still stationary, of the drive roller 1. As the planet wheel 22 is mounted on the mounting trunnion 24 of the planet carrier 23 which is rotatably mounted in the guide body 9, it necessarily entrains the planet carrier 23 in that rolling movement. As a result the planet carrier rolls with its tooth arrangement 25 around the guide gear 27 and in so doing entrains the guide body 9, by way of its bearing 26. As the guide body 9 is mounted eccentrically, its upper outside peripheral surface is moved upwardly relative to the base 2 and in so doing entrains the drive roller 1 which is mounted thereon. As a result the drive roller 1 is moved out of its lower rest position into the upper operative position and is thus pressed against the underside of the article to be driven. Due to the weight of that article, further movement of the drive roller 1 and therewith also the guide body 9 in an upward direction is blocked. Due to that blocking effect, the planet wheel 22 can now no longer roll against the internal gear ring 12 of the drive roller 1. It must begin to rotate in a stationary position so that such a high level of drive torque is positively applied to the drive roller 1 that the braking moment of the bearing friction of the bearings 13 relative to the guide body 9 is overcome and the drive roller 1 begins to rotate. That rotary movement of the drive roller 1 which is pressed against the underside of the article to be conveyed applies a tangential force to the article to be conveyed so that it is set in movement in the desired manner.

In regard to the above-described mode of operation, a point of very great importance is that the direction of rotation of the planet wheel 22 and the drive roller 1 in relation to the direction of transportation movement of the article to be conveyed are so selected that, in the drive position in which the drive roller 1 is pressed against the underside of the article to be driven, the article to be driven applies to the drive roller 1 a braking moment which is due to its inherent inertia or frictional forces, in the same direction as is also provided by the bearing friction of the bearings 13. starting from the rest position. It is only in that way that it is possible to ensure that the inhibiting braking effect of the article to be conveyed causes the drive roller 1 to be pressed against the bottom of that article in the same manner as was initially produced by virtue of the bearing friction. Choosing the wrong direction of rotation of the planet wheel 22 and the internal gear ring 12 of the drive roller 1 would impede that self-sustaining function of the drive roller in the upper rest position.

It is to be noted in that respect that the bearing friction of the bearings 13 can also be disregarded in certain situations of use. It may be assumed that the rest position of the drive roller 1 is so selected that, in that rest position, with the electric motor means 8 in the switched-off condition, an article to be conveyed already bears against the surface of the drive roller 1. If in that condition the electric motor means 8 is switched on, then the article which rests on the drive roller 1, due to its inertia, exerts such a strong braking moment that initially the above-described rolling movement of the planet wheel 22 against the internal gear ring 12 takes place and the planet wheel 22, by way of the planet carrier 23 and the rolling movement thereof against the guide gear 27, seeks to pivot the guide body upwardly about its eccentric axis of rotation, together with the drive roller 1. That pivotal movement is permitted and restricted by the resiliency of the roller casing portion 11; it provides that the drive roller 1 is pressed against the underside of the article to be conveyed, so that further pivotal movement is prevented and the planet wheel 22 causes the drive roller 1 to rotate in the above-described manner.

If now, with the unit in the above-indicated driving operative condition, the supply of power to the electric motor means 8 is switched off, the rotor 80 of the electric motor means 8 comes to a halt relative to the stator 82 so that the torque applied to the drive roller 1 by the planet wheel 22 disappears, as well as the drive torque for rotating the guide body 9 upwardly. Because of the eccentric axis of rotation of the guide body 9 and the resulting asymmetric distribution of weight in relation to that axis of rotation the guide body 9 therefore pivots back into its rest position as shown in FIG. 1 and, in performing that pivotal movement, also entrains the drive roller 1 downwardly therewith so that the drive roller 1 again comes out of engagement with the bottom of the article to be conveyed or is at least no longer pressed against the bottom of the article.

A practical configuration of the first embodiment of the drive roller unit according to the invention, the practical configuration being shown in simplified form in respect of many details, will now be described with reference to FIG. 2.

Figure 2:
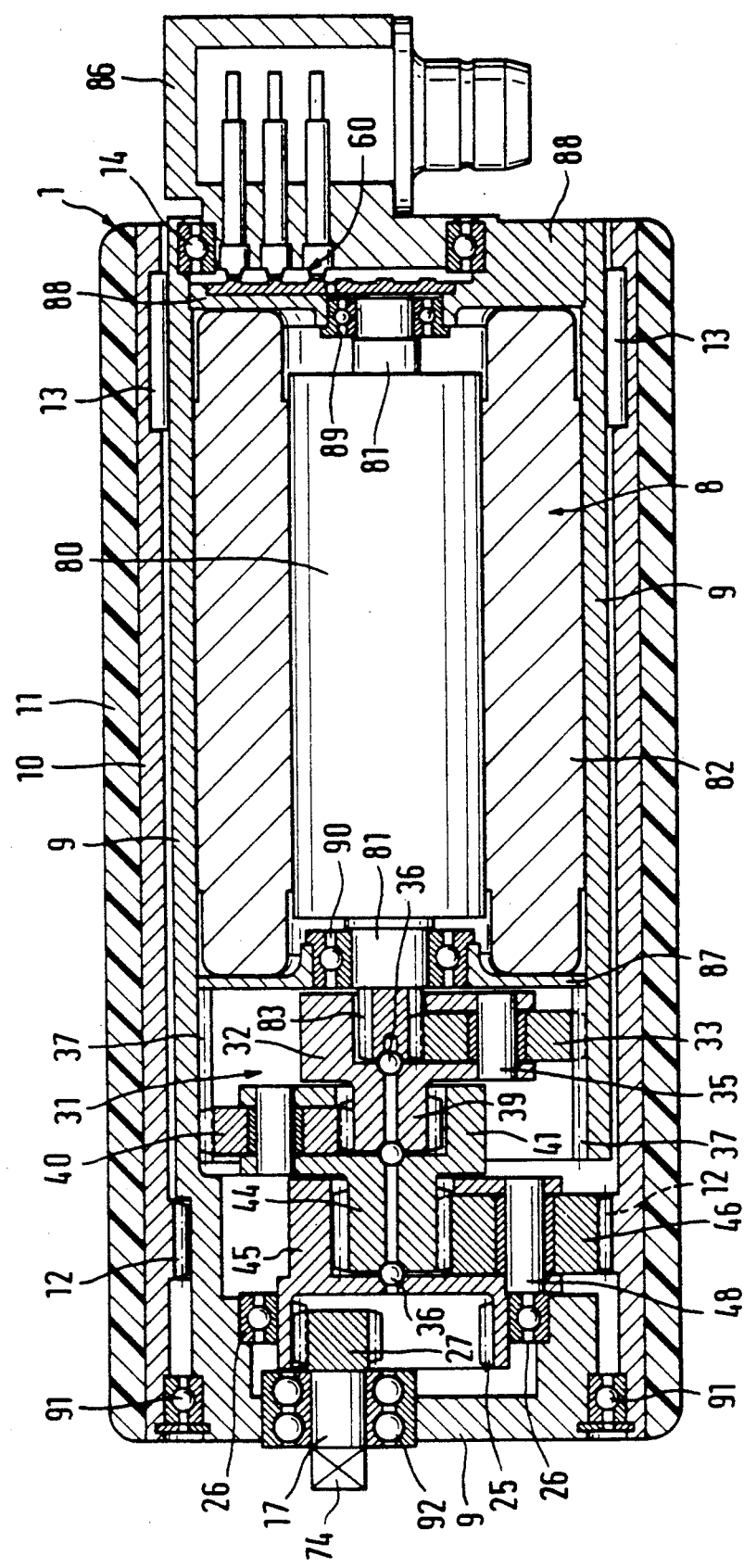
FIG. 2 is a simplified view in longitudinal section of a practical construction of the first embodiment of a drive roller unit, shown in FIG. 1.

As shown in FIG. 2, this construction of the drive roller unit includes an outer, substantially hollow-cylindrical drive roller 1 which is rotatably mounted by means of the rolling bearings 13 and 91 on circular-cylindrical outside peripheral surface regions of the guide body 9. Disposed in the interior of the guide body 9 which is in the form of a hollow body are an electric motor means 8 which is arranged in the right-hand part in FIG. 2, a planetary transmission 31 which adjoins same towards the left thereof, and a guide gear 27 which is again to the left of the planetary transmission and which meshes with a tooth arrangement 25 of a planet carrier of the planetary transmission 31.

The electric motor means 8 includes a stator 82 which includes the field winding (not shown), and a rotor 80 which is rotatably mounted concentrically within the stator 82 in rolling bearings 89 and 90 respectively. The stator 82 is arranged concentrically with respect to the circular-cylindrical outside peripheral surface regions of the guide body 9 and is fixedly connected to the guide body 9. The supply of power thereto is by way of an only diagrammatically indicated contact assembly 60 comprising slip rings and sliding contacts. The contact assembly 60 is connected to the power supply of the base by way of a connecting housing 86 which is fixedly connected to the base.

For the purposes of mounting the rotor 80, arranged in the interior of the guide body 9 and fixedly connected thereto on the right-hand side in FIG. 2 is a substantially radial mounting flange 88 in which the right-hand end of the rotor shaft 81 of the rotor 80 of the electric motor means 8 is mounted by way of a rolling bearing 89. The left-hand end of the rotor shaft 81 is mounted by way of the rolling bearing 90 in a further mounting flange 87 which is also connected to the guide body 9.

The connecting housing 86 is in the form of a hollow body which serves on the one hand for fixing to the base and on the other hand for providing for the supply of power to the field winding of the stator 82 of the electric motor means 8. The interior of that hollow body may accommodate various components such as for example a thermally operated protective circuit breaker, a connecting plug for power connection to the base and the above-mentioned contact assembly 60 for the supply of power to the stator 80 which is rotatable and pivotable relative to the base.

The guide body 9 which encloses the electric motor means 8 is mounted rotatably relative to the base at the right-hand axial end in FIG. 2, by means of the rolling bearing 14, by way of the connecting housing 86. The axial end of the guide body 9 which is at the left in FIG. 2 is rotatably mounted by way of the rolling bearing 92 on a mounting trunnion 17 which can be non-rotatably connected to the base by means of a square portion 74. The axis of rotation of the guide body 9, which is determined by the rolling bearings 92 and 14, is eccentric with respect to the circular-cylindrical outside peripheral surface regions of the guide body 9, on which the drive roller 1 is rotatably mounted by means of the rolling bearings 13 and 91.

The drive roller 1 is substantially in the form of a hollow circular cylinder which surrounds the guide body 9. The drive roller 1 comprises a roller body 10 and a roller casing portion 11 which covers the outside surface of the roller body 10 and which is fixedly connected to the roller body 10. The roller casing portion 11 comprises a wear-resistant elastic plastic material while the roller body 10 is made from metal. Disposed in the vicinity of each of the two axial ends of the roller body 10 at the inside of the roller body 10 are respective rolling bearings 13 and 91 with which the roller body 10 is rotatably mounted on the circular-cylindrical outside peripheral surface regions of the guide body 9. The portion of the inside of the roller body 10, which is at the left in FIG. 2, is provided with an internal gear ring 12 which is arranged concentrically with respect to the longitudinal axis of the hollow-cylindrical roller body 10 and relative to the outside peripheral surface regions of the guide body 9.

Disposed in the interior of the guide body 9 which is in the form of a hollow body, to the left of the mounting flange 87 which supports the rotor shaft 81, in FIG. 2, is a planetary transmission 31 with three transmission stages which are disposed in succession in the axial direction. The first two transmission stages, starting from the rotor shaft 81, are provided only for the purposes of stepping down the speed of rotation, while the third transmission stage provides the function, which is important in regard to the mode of operation of the roller drive unit, of pivoting the drive roller 1 from the rest position into the drive position, while also providing for the rotary drive for the drive roller 1, as already described hereinbefore with reference to FIG. 1. That means that the planetary transmission 20 diagrammatically shown in FIG. 1 corresponds to the third stage (which is shown entirely at the left in FIG. 2) of the planetary transmission 31.

The first two stages of the planetary transmission 31 are of conventional configuration from the point of view of the function thereof so that the following brief description is sufficient for the purposes of the man skilled in the art. In the first stage the planetary transmission 31 includes a planet carrier 32 on which three planet wheels 33 are mounted by means of mounting trunnions or stub axles 35. The planet wheels 33 rotate on a sun wheel which is formed by an external tooth configuration 83 on the left-hand end of the rotor shaft 81.

Axially towards the left in FIG. 2, formed on the first planet carrier 32 and in one piece therewith is the sun wheel 39 of the second transmission stage on which the planet wheels 40 which are mounted on mounting trunnions or stub axles on the planet carrier 41 in turn rotate: Also towards the left in FIG. 2, formed in one piece on the second planet carrier 41 is the sun wheel 44 of the third transmission stage, on which the planet wheels 46 of the third transmission stage rotate, the planet wheels 46 being rotatably mounted on the planet carrier 45 by means of mounting trunnions or stub axles 48. A respective bearing ball 36 is arranged between the left-hand face of each sun wheel and the associated surface, which follows same towards the left, of the respective planet carrier, in order to ensure that those adjacent components are freely rotatable relative to each other, with a low level of friction.

The planet wheels 33 and 40 of the first and second transmission stages are each in meshing engagement with a respective crown wheel 37 which is disposed therearound and which is in the form of an internal tooth arrangement on the guide body 9.

As already mentioned, the third transmission stage of the planetary transmission 31 is of a different configuration from the first and second transmission stages. The planet wheels 46, of which only one is shown in the drawing, of the third transmission stage are in meshing engagement on the one hand with the sun wheel 44 and on the other hand with the internal gear ring 12, which is in the form of a crown wheel, of the drive roller, as was described in detail hereinbefore in relation to FIG. 1, in respect of the planetary transmission 20.

The planet carrier 45 of the third transmission stage is rotatably mounted by means of the rolling bearing 26 in the guide body 9 in concentric relationship with the circular-cylindrical outside peripheral surface regions thereof. The planet carrier 45 is provided with a tooth arrangement 25 which, in the present embodiment, is in the form of an internal gear ring in a recess in the portion of the planet carrier 45, which portion is at the left in FIG. 2. The tooth arrangement 25 is disposed concentrically with respect to the circular-cylindrical outside peripheral surface regions of the guide body 9 and is disposed eccentrically around a guide gear 27 with which the tooth arrangement 25 is in constantly meshing engagement. The guide gear 27 is rigidly and non-rotatably connected to the mounting trunnion 17 and therewith also to the base.

The mode of operation of the above-described embodiment has in principle already been described in detail with reference to the diagrammatic view in FIG. 1. The important consideration in regard to the desired mode of operation is that the guide body 9 is mounted rotatably about an axis of rotation which is arranged eccentrically with respect to its outside peripheral surface regions on which the drive roller 1 is concentrically mounted. Other points of significance are that the stator 82 of the electric motor means 8 is fixedly connected to the guide body 9, that the internal gear ring 12 of the drive roller 1 represents the crown wheel of the third transmission stage 31, that the planet carrier 45 of the third transmission stage of the planetary transmission 31 is mounted rotatably in the guide body 9 and that the tooth arrangement 25 of the planet carrier 45 eccentrically surrounds the guide gear 27. The last-mentioned feature provides that, in the rolling movement of the planet carrier 45, when the electric motor means 8 is switched on, the guide body 9 and therewith the drive roller 1 performs a pivotal movement out of the lower rest position into the upper drive position.

Figure 3:
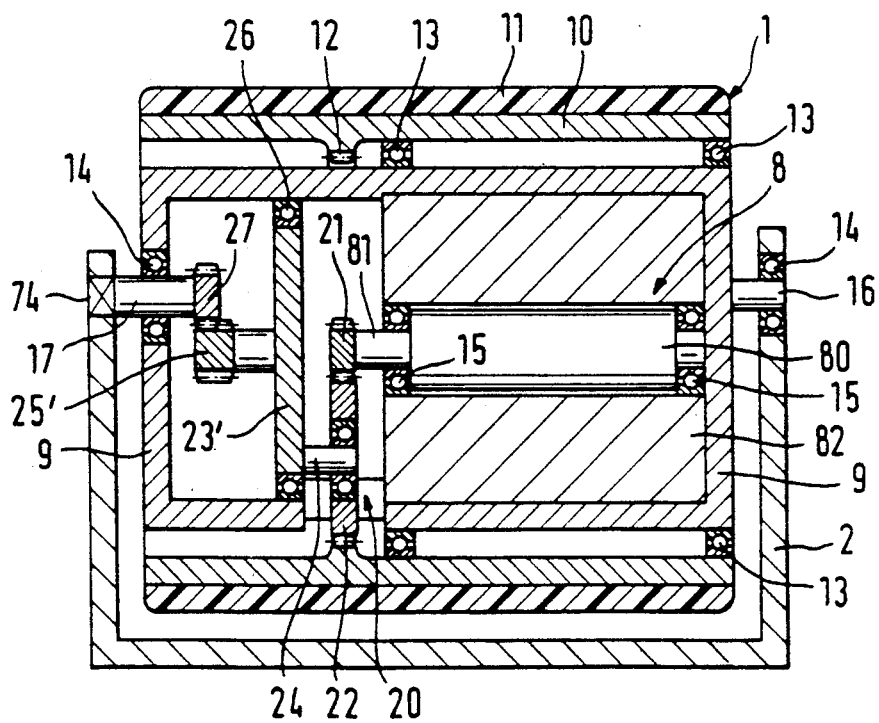
FIG. 3 is a highly diagrammatic vertical longitudinal section of a second embodiment of the drive roller unit according to the invention.

FIG. 3 shows a highly simplified and diagrammatic view of a second embodiment of a drive roller unit according to the invention. In FIG. 3, components which correspond to the appropriate components of the first embodiment shown in FIGS. 1 and 2 are identified by the same references, while components which are different from the construction shown in FIG. 1 are identified by the same reference numeral, with an apostrophe.

The second embodiment shown in FIG. 3 essentially differs from the embodiment shown in FIGS. 1 and 2 only in that the tooth arrangement 25' on the planet carrier 23' is in the form of an external tooth arrangement, in other words, in the form of a gear which is rigidly and non-rotatably connected to the planet carrier 23' and which rolls agains the guide gear 27 in the pivotal movement of the drive roller unit from the lower rest position into the upper operative position.

As that is the only difference of substance in relation to the first embodiment and as in other respects the mode of operation does not differ from the mode of operation already described above, a more detailed description is not required, from the point of view of the man skilled in the art, and the foregoing description accordingly applies in a corresponding manner.

It will be appreciated that the above-described units have been set forth solely by way of example and illustration of the invention and that further modifications and alterations may be made without thereby departing from the invention.

What is claimed is:

1. A drive roller unit for driving an article on a conveyor track comprising:
   a base (2);
   a guide body (9) having a space therein and having circular-cylindrical outside peripheral surface means;
   means mounting the guide body (9) rotatably about an axis of rotation which is stationary with respect to the base (2) and which is eccentric with respect to said circular-cylindrical outside peripheral surface means of said guide body (9);
   a drive roller (1) substantially in the form of a hollow circular cylinder and rotatably mounted on said outside peripheral surface means of said guide body (9) in concentric relationship therewith;
   an electric motor means (8) disposed within the guide body (9) and operable to drive the drive roller (1) in rotation, the electric motor means including a stator fixedly connected to the guide body (9);
   an internal gear ring means (12) disposed at the inside of the drive roller (1) non-rotatably relative thereto and concentric with respect thereto;
   a planetary transmission (20) operatively disposed between the electric motor means (8) and the drive roller (1) for driving of the drive roller (1), the electric motor means (8), the guide body (9) and the planetary transmission (20) being arranged in the interior of the drive roller (1), and the planetary transmission comprising a crown wheel in the form of said internal gear ring means (12) of said drive roller (1), at least one planet wheel (22) meshing with said internal gear ring means (12), a sun wheel (21) meshing with said planet wheel (22), said sun wheel being adapted to be driven by said electric motor means (8), and a planet carrier which carries said at least one planet wheel (22) and which is rotatably mounted in said guide body (9) concentrically with respect to said outside peripheral surface means thereof, the planet carrier (23) including a tooth means (25, 25') concentric with respect to said outside peripheral surface means of the guide body (9); and a guide gear (27) rigidly and non-rotatably connected to said base and concentric with respect to said eccentric axis of rotation of the guide body (9), said tooth means (25, 25') being in meshing engagement with said guide gear (27), the assembly being adapted by virtue of rotational movement of said guide body (9) about said axis of rotation to move said drive roller (1) relative to said base (2) between a lower rest position and an upper drive position in which said drive roller (1) is adapted to engage with the underside of a said article to be driven which is disposed above the unit.

2. A drive roller unit as set forth in claim 1 wherein said electric motor means (8) includes a rotor (80) and said stator (82) arranged concentrically relative to each other and concentrically relative to said outside peripheral surface means of the guide body (9).

3. A drive roller unit as set forth in claim 1 wherein said tooth means (25) of the planet carrier (23) is in the form of an internal gear ring means which eccentrically surrounds the guide gear (27) and which is concentric with respect to said outside peripheral surface means of the guide body (9).

4. A drive roller unit as set forth in claim 1 wherein said tooth means (25') of the planet carrier (23') is in the form of an external tooth means which is adapted to roll against the guide gear (27) and which is concentric with respect to said outside peripheral surface means of the guide body (9).

5. A drive roller unit as set forth in claim 1 including mounting means (13) mounting the drive roller (1) on the guide body (9) and adapted to brake the rotary movement of the drive roller (1) relative to the guide body (9) with a predetermined braking force.

* * * * *